US012576737B2

(12) United States Patent　　　　(10) Patent No.:　US 12,576,737 B2
Auberger et al.　　　　　　　　　　(45) Date of Patent:　Mar. 17, 2026

(54) METHOD FOR OPERATING A MOTOR VEHICLE FOR A CHARGING PROCESS OF A TRACTION BATTERY AND MOTOR VEHICLE

(71) Applicant: AUDI AG, Ingolstadt (DE)

(72) Inventors: Florian Auberger, Kösching (DE); Daniel Renner, Wurmannsquick (DE)

(73) Assignee: AUDI AG, Ingolstadt (DE)

( * ) Notice: Subject to any disclaimer, the term of this patent is extended or adjusted under 35 U.S.C. 154(b) by 1003 days.

(21) Appl. No.: 17/545,345

(22) Filed: Dec. 8, 2021

(65) Prior Publication Data

US 2022/0234459 A1　　Jul. 28, 2022

(30) Foreign Application Priority Data

Jan. 27, 2021　(DE) .......................... 102021101812.9

(51) Int. Cl.
　　*B60L 53/30*　　　(2019.01)
　　*B60L 53/64*　　　(2019.01)
　　*B60L 53/66*　　　(2019.01)
(52) U.S. Cl.
　　CPC ............. *B60L 53/305* (2019.02); *B60L 53/64* (2019.02); *B60L 53/66* (2019.02)
(58) Field of Classification Search
　　None
　　See application file for complete search history.

(56) References Cited

U.S. PATENT DOCUMENTS

| 10,882,411 | B2 | 1/2021 | Yang |
| 2009/0313103 | A1 | 12/2009 | Ambrosio et al. |

(Continued)

FOREIGN PATENT DOCUMENTS

| CN | 108197765 A | 6/2018 |
| CN | 108665088 A | 10/2018 |

(Continued)

OTHER PUBLICATIONS

German Search Report issued on Sep. 13, 2021 in corresponding German Application No. 102021101812.9; 22 pages; Machine translation attached.

(Continued)

*Primary Examiner* — David V Henze-Gongola
(74) *Attorney, Agent, or Firm* — Maier & Maier, PLLC

(57) ABSTRACT

A method for operating a motor vehicle for a charging process of a traction battery of the motor vehicle. In a control device assigned to the charging device and installed inside the motor vehicle, the user information describing at least one user request with regard to the charging process is received, energy information related to the electrical energy provided by the charging arrangement is received from the charging arrangement via a communication connection to the charging arrangement, a charging period that is likely to be available for the charging process is ascertained, a charging plan for the charging period that is optimized with respect to at least one optimization goal which is ascertained from the user information is ascertained using time-resolved optimization information of the energy information relating to the optimization goal, and the charging process is carried out according to the charging plan.

20 Claims, 2 Drawing Sheets

(56)                    References Cited

U.S. PATENT DOCUMENTS

| | | | |
|---|---|---|---|
| 2013/0179061 | A1 | 7/2013 | Gadh |
| 2014/0111165 | A9* | 4/2014 | Dietze ..................... B60L 53/64 |
| | | | 320/137 |
| 2015/0039391 | A1* | 2/2015 | Hershkovitz ........ G01R 31/382 |
| | | | 705/7.31 |
| 2015/0298567 | A1 | 10/2015 | Uyeki |
| 2019/0039465 | A1* | 2/2019 | Jang ...................... B60L 53/665 |
| 2019/0041940 | A1* | 2/2019 | Lota ...................... H02J 7/0013 |
| 2019/0202314 | A1 | 7/2019 | Boeswald et al. |
| 2019/0217739 | A1* | 7/2019 | Sinha ...................... B60L 53/62 |
| 2020/0055419 | A1* | 2/2020 | Kim ........................ G06Q 10/02 |
| 2020/0212816 | A1 | 7/2020 | Sun et al. |
| 2022/0097547 | A1* | 3/2022 | Ibrahim .................. B60L 53/52 |

FOREIGN PATENT DOCUMENTS

| | | | |
|---|---|---|---|
| CN | 109070760 | A | 12/2018 |
| DE | 202010005543 | U1 | 9/2010 |
| DE | 102011008675 | A1 | 7/2012 |
| DE | 102011008676 | A1 | 7/2012 |
| DE | 102012209645 | A1 | 12/2013 |
| DE | 112013007137 | T5 | 3/2016 |
| DE | 102016212071 | A1 | 1/2018 |
| DE | 102017125393 | A1 | 11/2018 |
| DE | 102018219977 | A1 | 5/2020 |
| JP | 2014096928 | A | 5/2014 |
| WO | 2012095128 | A2 | 7/2012 |
| WO | 2012095129 | A2 | 7/2012 |

OTHER PUBLICATIONS

Office Action issued on Jan. 8, 2025, in corresponding Chinese Application No. 202111521677.6, 42 pages.

Office Action issued on Mar. 29, 2025, in corresponding Chinese Application No. 202111521677.6, 22 pages.

* cited by examiner

METHOD FOR OPERATING A MOTOR VEHICLE FOR A CHARGING PROCESS OF A TRACTION BATTERY AND MOTOR VEHICLE

FIELD

The invention relates to a method for operating a motor vehicle for a charging process of a traction battery of the motor vehicle, wherein the traction battery is connected to a charging arrangement external to the motor vehicle via a charging device of the motor vehicle. The invention furthermore relates to a motor vehicle.

BACKGROUND

Modern motor vehicles, as electric motor vehicles and/or hybrid motor vehicles, in particular plug-in hybrid motor vehicles, have an electric traction battery, the stored electrical energy of which can be used to drive the motor vehicle. Such a traction battery can also be referred to as a high-voltage battery. To be able to charge the high-voltage battery via an external charging arrangement, for example a charging column, wallbox, or the like, the motor vehicle usually has a charging device assigned to the traction battery, which is also referred to as an on-board charger (OBC). The motor vehicle is connected to the charging arrangement by means of a corresponding connecting cable and a charging process can be carried out, controlled by a control device assigned to the charging device. The charging process is usually started immediately with connection to the charging arrangement, in particular after negotiation of charging parameters. The charging process is limited by the capacity of the traction battery or the motor vehicle.

It has already been proposed that options be provided for influencing the specific way the charging process is carried out. For example, specifying a departure time as end-of-charge information is known, in order to be able to shift the time window in which the traction battery is charged, if necessary. A limitation of the charging current/the charging power takes place only on the basis of the specifications of the capacity of the traction battery or the properties of the charging arrangement.

US 2015/0298567 A1 relates to a system and a method for reducing electricity consumption by an electric vehicle which is connected to a charging station. Communication between the electric vehicle and a tracking server takes place via a wireless network, wherein items of user and location information for charging electric vehicles are collected on the tracking server. If an item of consumption reduction information is received on the tracking server, a charging interruption signal can be sent to certain electric vehicles.

US 2013/0179061 A1 relates to an expert system for the management of a power network, wherein charging stations are connected to the power network. Electric vehicles can be connected to the charging stations, wherein power from connected electric vehicles can also be fed back into the power network. In a more traditional use, the expert system can carry out charging processes for the entire power network, taking user presets into consideration, wherein the power network is prevented from being overloaded.

JP 2014 096928 A relates to a charging plan management device for managing charging plans for power storage devices of a plurality of electric vehicles used by a plurality of users. A usage history for the various electric vehicles is saved. An estimation unit estimates a minimum charge amount required for each electric vehicle on the basis of the usage history, from which a charging plan is ascertained for each electric vehicle on the basis of the minimum charge amount required.

SUMMARY

The invention is based on the object of specifying an operating method for a motor vehicle during a charging process that is improved in comparison and that in particular does not require complex infrastructure measures.

To achieve this object, it is provided according to the invention in a method of the type mentioned at the outset that in a control device assigned to the charging device and installed inside the motor vehicle user information describing at least one user request with regard to the charging process is received, energy information related to the electrical energy provided by the charging arrangement is received from the charging arrangement via a communication connection to the charging arrangement, a charging period that is likely to be available for the charging process is ascertained, a charging plan for the charging period that is optimized with respect to at least one optimization goal which is ascertained from the user information is ascertained using time-resolved optimization information of the energy information relating to the optimization goal, and the charging process is carried out according to the charging plan.

The control device can be, for example, at least one control unit of the motor vehicle that is assigned to the charging device, which can also be referred to as an on-board charger (OBC). The present invention takes advantage of the fact that modern charging arrangements, and consequently modern charging infrastructure, are mostly also standardized with regard to communication with connected motor vehicles and permit the transmission of a large number of useful items of energy information to the motor vehicle via a corresponding communication protocols, for example in accordance with the ISO 15118 standard and/or the EEBus standardization, which from the outset comprise items of optimization information that are suitable for the motor-vehicle-side implementation of an optimization goal. An optimization goal is to be understood as the minimization or maximization of a cost function that describes at least one optimization variable. In principle, optimization methods known in the prior art can be used here. In these optimization methods, the optimization parameters to be optimized are selected in such a way that the cost function is minimized or maximized. In the present case, optimization parameters can describe how and when the traction battery of the motor vehicle is charged from the charging arrangement via the charging device. A minimization of financial costs and/or a maximization of the amount of green electricity and/or a minimization of the power loss and/or the carbon dioxide emission can preferably be used as an optimization goal and/or the energy information can comprise time-itemized electricity prices and/or time-itemized electricity compositions and/or time-itemized available charging powers. For example, it is therefore possible to transmit items of price/power information as energy information to the motor vehicle, preferably via the charging cable itself. This includes, for example, knowledge about when electrical power is cheap, when a particularly large amount of charging power is available, what type of electricity (for example, green electricity/renewable energy) is available or whether electrical energy is even provided free of charge due to the use of solar power. With these items of energy information, a charging process can be optimized with regard to costs, power loss (upstream emissions), green electricity, carbon dioxide consumption, and/or the like, for example. Accordingly, the invention provides for a charging plan to be created with all available items of information, in particular also items of user information providing specifications, and for this to be implemented afterwards. Depending on the specifications of the user and the available items of energy information, the charging plan is calculated in such a way that at least one defined optimization goal is met, for example, charging is cost-optimized and/or green-electricity-optimized. If multiple optimization goals, in particular multiple optimization variables, are to be taken into consideration here, these can be implemented in a weighted manner by corresponding portions of the cost function, in particular cost terms.

This not only enables a charging process according to the specifications and preferences of the user and excellent automation that uses items of information transmitted by the charging arrangement in accordance with modern standardization measures, but the implementation is particularly advantageously selected so that the ascertainment of the charging plan takes place exclusively within the motor vehicle, in particular without considering further motor vehicles, thus more or less autonomously. There is therefore no need for communication between the energy supplier and the motor vehicle that is complex to define and/or implement, since the motor vehicle can autonomously ascertain an optimal charging strategy. The charging plan is therefore calculated in the motor vehicle in a decentralized manner and independently of the infrastructure, which is only a limiting factor, for example with regard to the charging power, wherein the knowledge about this is provided by means of the energy information. Even without communication to the infrastructure, the charging process can be optimized according to cost, energy, and/or time aspects. As already mentioned, it is particularly preferred if the items of energy information are transmitted via the charging cable, in particular by means of PLC (Powerline Communication).

The user information can be accepted at least partially by an input device of the motor vehicle, for example a man-machine interface (MMI) and/or an onboard computer, and relayed to the control device. In the context of the present invention, however, it is particularly preferred if the user information is received at least partially from application software of a mobile device and/or a desktop computer. In this way, modern electronic devices are used in order to allow a user to configure the autonomous charging plan optimization of the motor vehicle for himself particularly conveniently. In particular, application software can be used, via which other aspects of the motor vehicle can also be configured and/or controlled, for example the activation of an auxiliary heater or the like. In particular, it is also conceivable, as will be discussed in more detail below, to allow at least partially manual creation or modification of the charging plan via such application software.

Expediently, the end of the charging period can be ascertained on the basis of end-of-charge information contained in the user information and/or on the basis of received calendar data from at least one user of the motor vehicle and/or on the basis of a usage profile created in particular by evaluating historical data describing the use of the motor vehicle in the past. While it is therefore possible for the user to input how much time is available for charging, possibly minimally, an automatic estimation of the charging period is additionally or alternatively also fundamentally conceivable. It is thus possible, for example, to evaluate calendar data of the user, whereby, for example, conclusions can be drawn about upcoming appointments or the like for which the motor vehicle is required. However, it is also possible to use historical data to ascertain a usage profile over time, for example to establish whether and when a user drives to work or the like on the days of the week. Such estimation processes for the use of motor vehicles, which can also at least partially use artificial intelligence, are fundamentally already known in the prior art and can also be used advantageously within the scope of the present invention.

In a particularly advantageous embodiment of the present invention, it can be provided that the charging period is divided into a plurality of charging intervals, in particular of equal length. The time from connecting the motor vehicle to the charging arrangement up to the end of the charging period is therefore divided into time intervals or time segments, which can particularly advantageously be coordinated with the time-related components of the energy information. In other words, an expedient refinement of the invention provides that the division takes place in accordance with a division into time segments to which items of optimization information are assigned in the energy information and/or in accordance with a standard for communication between the charging device and the charging arrangement. For example, the energy information of the charging arrangement can be used to convey when which charging powers, electricity prices, electricity compositions, and the like are available, which is usually also based on a certain discretization of the time, which can be adopted accordingly for the division into charging intervals, so that then for each charging interval certain, fixed optimization information is available and changes in a parameter, for example the costs and/or the current composition, only occur at transitions between charging intervals. If a norm/a standard is used with regard to the communication protocol, this can already specify a corresponding time division, which is then also used in the control device of the motor vehicle when ascertaining the charging plan. Corresponding lengths of time segments that can be used as charging intervals can be found in the specifications of the ISO15118 standard, for example.

Particularly advantageously, a cost value related to the at least one optimization goal can then be determined for each charging interval of the charging period and, in order to ascertain the charging plan, the charging intervals of the charging period can be selected, in particular in succession, according to the optimization goal for charging, so that at least one target state of charge of the traction battery is reached at least at the end of the charging period. Therefore, based on the items of optimization information in the items of energy information, cost contributions can be ascertained for the various charging intervals, which can also be correspondingly included in the cost terms of the cost function. Such cost contributions can be, for example, financial costs (electricity costs), green electricity proportions, power losses, and the like. When optimizing towards an optimization goal, for example with regard to the costs or the highest possible proportion of green electricity, this consideration also allows a simple procedure for the optimization, according to which the charging intervals can ultimately be selected (filled) for charging rising or falling in succession from the lowest to the highest cost value, until the charging goal is reached.

It should be noted at this point that the target state of charge can be selected, for example, as the maximum state of charge that is reasonable with regard to the battery; it is of course also conceivable, in particular when calendar data and/or a user profile is used and/or user information in this regard is available, to select a special other target state of charge with regard to the next upcoming journey.

In an expedient embodiment of the invention, it can be provided that the charging device is designed to adapt the charging power, wherein the charging power is used as an optimization parameter of the charging plan. An adaptation of the charging power can be useful, for example, if a power loss in the motor vehicle is to be optimized and different power losses are established for certain charging powers and possibly certain other circumstances, which, for example, as will be explained in more detail, can be established by evaluating corresponding items of vehicle information. In addition, a lower charging power can also be useful if, for example, electrical power has to be used at an expensive time in order to still be able to reach the target state of charge.

When ascertaining the charging plan, vehicle information available in the motor vehicle relating to a vehicle component participating in and/or affected by the charging process can preferably also be taken into consideration, in particular at least one characteristic curve. In order to be able to calculate the charging plan as exactly as possible, vehicle-internal knowledge can be used in the form of the vehicle information. For example, characteristic curves and/or other items of vehicle information can be retrieved from participating vehicle components and/or their control devices and/or are present in the control device anyway. This can improve the quality of the charging plan. Relevant vehicle components or vehicle systems can be, for example, the charging device itself, the traction battery, an energy management control unit, a thermal management control unit, and/or respectively assigned actuators and/or power electronics devices.

A preferred refinement of the invention in this context provides that the items of vehicle information are used to ascertain a power loss in the motor vehicle, in particular for at least one charging power used. If, for example, at least one of the at least one optimization goal is optimized with regard to power loss, in particular this is thus minimized, the items of vehicle information, in particular characteristic curves, can be used to estimate the power loss at certain charging powers so that, for example, the charging power can be adapted to minimize loss. For example, a thermal management control unit can supply the information about how much power loss would arise when charging at a certain predetermined charging power, for example 22 kW, in the current state of the motor vehicle.

Particularly advantageously, the method according to the invention can also be expanded with regard to bidirectional operation, that is, the possibility of discharging the traction battery into the power network connected via the charging arrangement. It can thus be provided that, in addition to charging phases of the battery, the charging plan is also ascertained comprising discharging phases of the battery into a power network connected via the charging arrangement. Upon implementation of a bidirectional charging function, the utility of the method according to the invention increases further, since discharging can also be planned according to the principle described. Specifically, it can be provided that in a household network connected via the charging arrangement, to which a solar device that supplies electrical solar energy free of the costs of an external energy supplier is also connected, the traction battery is operated according to the charging plan as a temporary storage device for the solar energy. For example, it can thus be provided that the traction battery is charged with excess solar power on the weekend or during the day and energy from the traction battery of the motor vehicle is used to supply the household at night. In particular, usage profiles relating to the household network, to which the charging arrangement is connected as a power network, can be collected and a usage profile can also be created here, from which consumption within the household network can be ascertained, to which the bidirectional charging mode is to be adapted accordingly. If, for example, the motor vehicle is only needed again at a significantly later point in time, it can be used in the meantime as a temporary storage device for electrical energy. It should be noted that this usage function is not limited to solar devices, but it is also conceivable, for example, to collect inexpensive electricity, so to speak, and thus reduce the use of more expensive electricity.

In the context of the present invention, it is also conceivable that when a manual operating mode is selected, a part of the charging plan is specified manually by a user, in particular by means of the application software already mentioned. In principle, it is also conceivable here for the user to create a charging plan completely manually. The user is thus given the option of creating a charging plan and therefore charging in a cost-optimized manner. This is particularly useful if the user has knowledge that is not included in the items of energy information. Such knowledge can of course also be incorporated into the automatic generation via the user information, for example a limitation of the time in which charging is allowed. For example, it can be defined by a specification of the user in the items of user information that only night electricity rates from 10 p.m. to 6 a.m. are to be used and the like. For manual interventions in the charging plan, the user is offered an interface, preferably, as explained at the outset, on a hand-held mobile device, such as a smartphone, and/or a desktop computer. For example, a charging plan can be created and/or edited manually in the manner of an appointment calendar here.

In addition to the method, the invention also relates to a motor vehicle having a traction battery and a charging device having a control device assigned to it, which is distinguished in that the control device is designed to carry out the method according to the invention. All statements with respect to the method according to the invention may be transferred analogously to the motor vehicle according to the invention, so that the above-mentioned advantages can also be achieved thereby. The control device can have at least one storage means and at least one processor in order to be able to implement the steps of the method according to the invention. For example, the control device can have a first interface for accepting the user information and a second interface for accepting the energy information. Functional units can be provided for carrying out the steps of the method according to the invention, in particular a charging period ascertainment unit, an optimization unit, and a control unit for carrying out the charging process in accordance with the charging plan.

BRIEF DESCRIPTION OF THE FIGURES

Further advantages and details of the present invention will be apparent from the exemplary embodiments described below and in reference to the drawings. In the figures.

DETAILED DESCRIPTION

Figure 1:
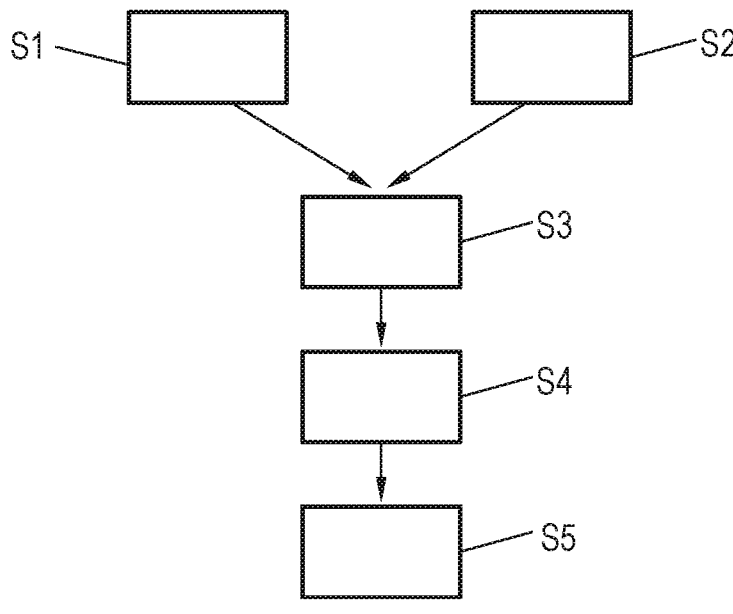
FIG. 1 shows a flow chart of an exemplary embodiment of the method according to the invention.

FIG. 1 shows a flow chart of an exemplary embodiment of the method according to the invention for operating a motor vehicle when carrying out a charging process for a traction battery of the motor vehicle, from which an electric motor for driving the motor vehicle can be fed. The traction battery is connected via a charging device of the motor vehicle, to which a control device is assigned, to a charging arrangement, for example a charging column, a wallbox, or the like, which provides electrical charging power from a power network, for example a household network. The connection can in particular take place via a charging cable. Via this charging cable or otherwise, communication can also take place in accordance with a communication proto- col, for example in accordance with the ISO15118 standard, within the framework of which the control device assigned to the charging device of the motor vehicle receives items of energy information from the charging arrangement. These items of energy information can comprise, for example, time-itemized electricity prices, charging powers that can be provided, electricity compositions that can be provided, in particular with regard to green electricity, and the like. According to FIG. 1, this energy information is received in a step S1. In a step S2, in particular much earlier, user information is also received via a corresponding interface of the control device, for example from an input device of the motor vehicle itself, but preferably, for example via a wireless interface of the motor vehicle, from a mobile device, for example a tablet or smartphone, and/or a desktop computer. In each case, the user information contains a specification by the user toward which optimization goal the charging process is to be carried out in an optimized manner. Multiple optimization goals, in particular with a weighting, can also be used here. Optimization goals include, for example, the lowest possible financial costs, the lowest possible power loss, the highest possible proportion of green electricity, the lowest possible carbon dioxide emissions for generating the electricity, and the like. Items of user infor- mation can also include end-of-charge information, which describes how long the charging period is expected to be according to the planning of the user. Other user specifica- tions can also be part of the user information, for example a restriction as to the times of day charging is to take place and/or also a target state of charge of the traction battery. Furthermore, the user information can also contain a speci- fication as to whether the motor vehicle is to be used as an intermediate storage device for electrical energy when it is possible to discharge the traction battery into the power network (bidirectional charging).

In a step S3, the available charging period is ascertained or estimated. If there is no end-of-charge information in this regard in the user information anyway, for example, calen- dar data of the user, which can also be present in the mobile device and/or desktop computer, for example, can be used, alternatively and/or additionally also a usage profile ascer- tained by evaluation of historical data describing the usage of the motor vehicle in the past.

In a step S4, the charging plan is then ascertained on the basis of the information obtained in steps S1 and S2 for the charging period of step S3. This ascertainment of the charg- ing plan and also its execution in step S5 take place solely in the motor vehicle, specifically in the control device, so that the motor vehicle more or less capable of autonomously ascertaining and applying an optimal charging strategy.

The optimization parameters used in step S4 are in particular the time periods, in particular charging intervals, at which charging is to take place, but also the charging power to be used, wherein various approaches can be used for optimization methods. A cost function can be minimized or maximized, wherein the cost function can describe in particular an optimization variable related to the optimiza- tion goal—for example the proportion of green electricity, financial costs, and the like. If there are multiple optimiza- tion goals and thus multiple optimization variables, these can be incorporated in a weighted manner in the cost function.

In the present case, the charging period in step S4 is now initially divided into a plurality of time segments, namely charging intervals. This division is based on a division on which the energy information is also already based, so that a parameter of the energy information is clearly assignable for each time interval. For example, a time division as proposed in accordance with ISO15118 can be used.

In one specific embodiment, charging power available, financial costs for the electricity, a composition of the electricity, and the like can therefore be assigned to each charging interval. The component of the energy information that is used in the following is ultimately defined by the at least one optimization goal to be used, that is, it contains parameters from which the optimization variable assigned to the optimization goal can be derived. This component of the energy information is accordingly to be referred to as optimization information. Due to the division into charging intervals and the clear assignment of items of optimization information to the time intervals, a cost value of the opti- mization variable can be ascertained in a simple manner for each time interval, on the basis of which the optimization can take place.

In one specific embodiment, if only one optimization goal is provided, charging intervals can be selected in succession for charging, for example increasing from the lowest cost value when minimizing or decreasing from the highest cost value when maximizing. If, for example, the financial costs are to be minimized, charging intervals with the lowest costs, thus also the lowest cost value, can be used first and filled in ascending order until the target state of charge is reached. A comparable procedure can of course be used with regard to other optimization goals, such as maximizing the proportion of green electricity and the like.

In preferred exemplary embodiments, in addition to the user information and the energy information, items of motor vehicle information, therefore internal knowledge of the motor vehicle, can also be used. Such items of motor vehicle information can contain, for example, characteristic curves, but also other useful data. For example, if the optimization is targeted at least partially at minimizing the power loss in the motor vehicle, the vehicle information can comprise data provided by a thermal management system of the motor vehicle, for example, on how much power loss would arise at certain charging powers in the current state of the motor vehicle. But even beyond the power loss as an optimization criterion, the consideration of items of vehicle information results in a more precise, higher-quality determination of the charging plan, since it can be ascertained, for example, how much consumed electrical power actually arrives in the traction battery, increasing its state of charge.

If, as already mentioned, "bidirectional charging" is to be possible, the charging plan can also be ascertained accordingly, wherein usage information with respect to the household network can particularly advantageously also be provided with the user information, from which the control device can conclude, for example, that during the day when no one is at home and everyone is at work, solar energy is to be collected from the solar device, which can then in turn be made available at night.

In step S5, as already mentioned, the control device uses the charging plan to carry out the charging process in accordance with the charging plan. In particular, charging is then carried out in charging intervals in which charging is to take place, if necessary with the corresponding charging power.

Figure 2:
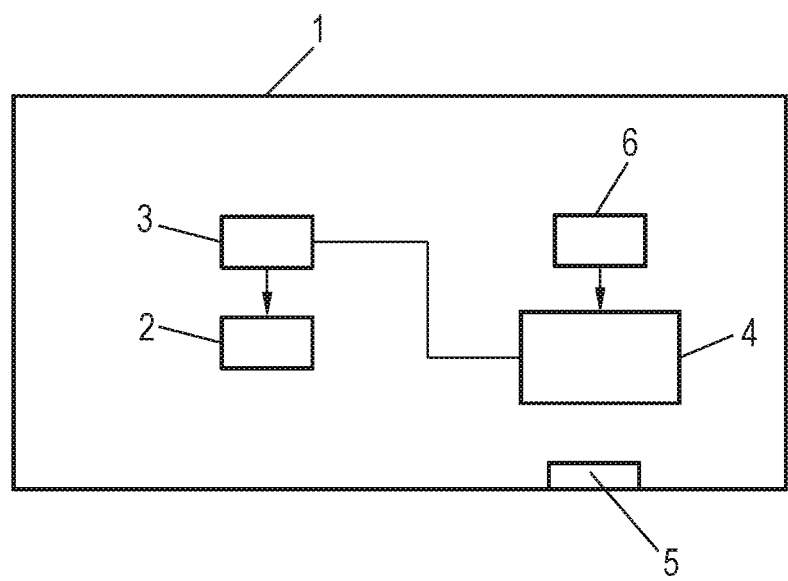
FIG. 2 shows a schematic diagram of a motor vehicle according to the invention.

FIG. 2 shows a schematic diagram of a motor vehicle 1 according to the invention. The motor vehicle 1, which in the present case is designed as an electric motor vehicle, has an electric motor 2 which can be fed from a traction battery 3 (high-voltage battery, for example at a voltage of 400 V). The traction battery 3 can be charged via a charging device 4 (on-board charger—OBC) when the charging arrangement is connected via a charging connection 5. The charging device 4, installed in the motor vehicle 1, is assigned, as described, a control device 6 which is designed to carry out the method according to the invention.

Figure 3:
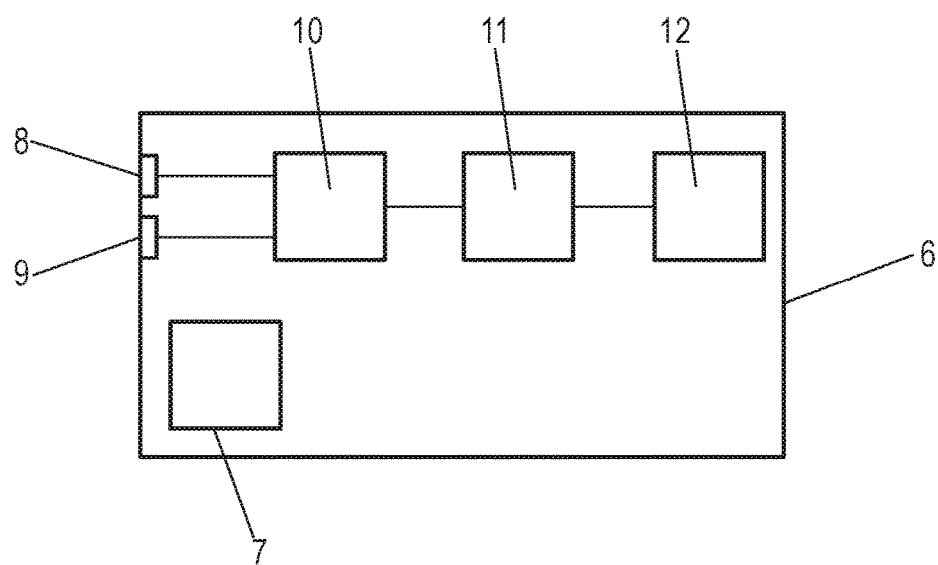
FIG. 3 shows the functional structure of a control device of the motor vehicle.

FIG. 3 shows the functional structure of the control device 6 in more detail. This first has a storage means 7 in which items of information, for example the items of user information, the items of energy information, the items of vehicle information, and also the ascertained charging plan, can be stored as long as they are needed. Items of user information can be accepted via a first interface 8 and items of energy information can be accepted via a second interface 9. In a charging period ascertainment unit 10, the charging period is ascertained in accordance with step S3. The charging plan is then ascertained in an optimization unit 11 in accordance with step S4. In a control unit 12, according to step S5, the ascertained charging plan is used to activate the charging device 4 in such a way that the charging plan is implemented.

Figure 4:
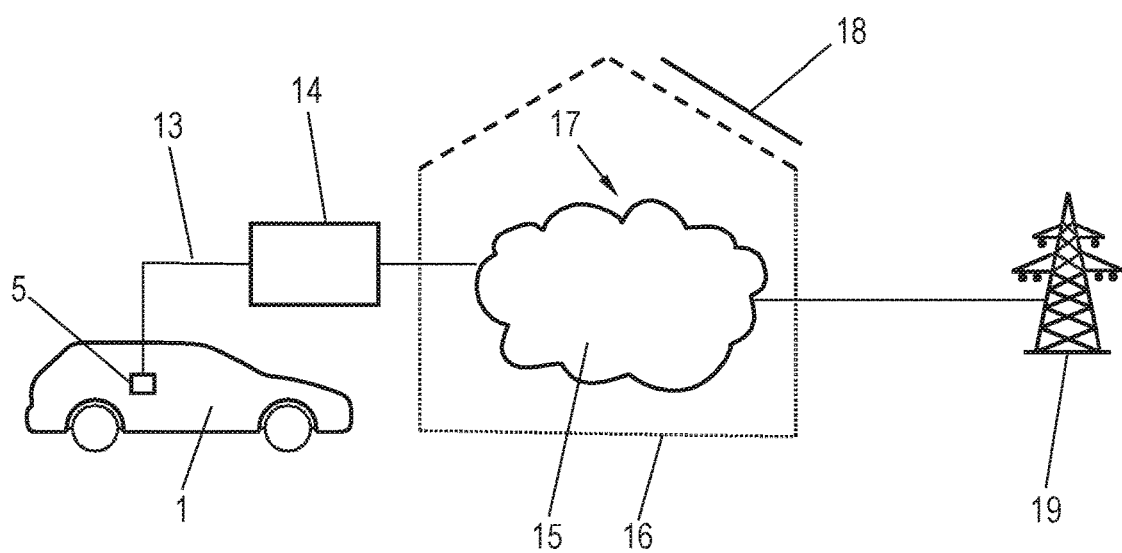
FIG. 4 shows a motor vehicle connected to a household network via a charging arrangement.

Finally, FIG. 4 shows the motor vehicle 1 as it is connected by means of a charging cable 13 via the charging connection 5 to a charging arrangement 14, for example in a garage. The items of energy information can also be transmitted via the charging cable 13 in accordance with the standardized communication protocol. The charging arrangement 14 provides the charging power from a power network 17, which is embodied here as a household network 15 that is assigned to a house 16. A solar device 18 is also connected to the power network 17 here. In addition, the power network 17 is connected to a further power network, namely a general energy supply network 19. By means of the method described here, the traction battery 3 in such a configuration can also be used as an intermediate storage device for the free, self-produced solar power, more precisely the electrical solar energy, of the solar device 18 in bidirectional charging mode.

The invention claimed is:

1. A method comprising:
   receiving user information describing at least one user request with regard to the charging process of a traction battery of the motor vehicle, wherein the traction battery is connected to a charging arrangement external to a motor vehicle via a charging device of the motor vehicle;

receiving energy information related to electrical energy provided by the charging arrangement from the charging arrangement via a communication connection to the charging arrangement;

estimating a charging period that is likely to be available for the charging process;

optimizing a bidirectional charging plan for the charging period with respect to an optimization goal ascertained from the received user information using energy information relating to the optimization goal, wherein ascertainment of the bidirectional charging plan takes place exclusively within the motor vehicle and the motor vehicle is configured to autonomously ascertain an optimal charging strategy; and carrying out the charging process according to the bidirectional charging plan, wherein execution take execution of the bidirectional charging plan takes place solely in the motor vehicle, and the motor vehicle is used as an intermediate storage device of a household network.

2. The method as claimed in claim 1, further comprising:
   receiving the user information at least partially from an input device of the motor vehicle.

3. The method as claimed in claim 1, further comprising:
   estimating an end of the charging period by evaluating historical data describing prior use of the motor vehicle.

4. The method as claimed in claim 1, wherein the charging period is divided into a plurality of charging intervals of equal length.

5. The method as claimed in claim 4, wherein the division takes place in accordance with a division into time segments to which items of optimization information are assigned in the energy information.

6. The method as claimed in claim 4, further comprising:
   wherein estimating a cost value related to the optimization goal for each charging interval of the charging period; and
   selecting charging intervals of the charging period in succession according to the optimization goal for charging, so that at least one target state of charge of the traction battery is reached at least at the end of the charging period.

7. The method as claimed in claim 1, further comprising:
   adapting the charging power, wherein the charging power is used as an optimization parameter of the bidirectional charging plan.

8. The method as claimed in claim 1, wherein a minimization of financial costs is used as an optimization goal.

9. The method as claimed in claim 1, further comprising:
   estimating the charging plan based upon at least one characteristic curve.

10. The method as claimed in claim 9, further comprising:
   estimating a power loss in the motor vehicle for at least one charging power used.

11. The method as claimed in claim 1, further comprising:
   estimating discharging phases of the battery into a power network connected via the charging arrangement.

12. The method as claimed in claim 11, further comprising:
   storing electrical solar energy from a solar device in the traction battery as a temporary storage device in a bidirectional charging mode.

13. The method as claimed in claim 1, further comprising:
   selecting a manual operating mode, wherein part of the charging plan is specified manually by a user.

14. The method as claimed in claim 1, further comprising:
optimizing the bidirectional charging plan without consideration of other motor vehicles.

15. A motor vehicle, comprising the traction battery and a charging device having a control device assigned to it, wherein the control device is configured to carry out the method of claim 1.

16. The method as claimed in claim 1, further comprising:
estimating an end of the charging period by evaluating historical data describing prior use of the motor vehicle.

17. The method as claimed in claim 2, wherein the charging period is divided into a plurality of charging intervals of equal length.

18. The method as claimed in claim 3, wherein the charging period is divided into a plurality of charging intervals of equal length.

19. The method as claimed in claim 5, further comprising:
estimating a cost value related to the optimization goal for each charging interval of the charging period; and
selecting the charging intervals of the charging period in succession according to the optimization goal for charging, so that at least one target state of charge of the traction battery is reached at least at the end of the charging period.

20. The method as claimed in claim 2, further comprising:
adapting the charging power, wherein the charging power is used as an optimization parameter of the bidirectional charging plan.

\* \* \* \* \*